United States Patent
Seiler et al.

(10) Patent No.: US 8,696,928 B2
(45) Date of Patent: Apr. 15, 2014

(54) OPERATING MEDIUM FOR AN ABSORPTION REFRIGERATION DEVICE

(75) Inventors: Matthias Seiler, Griesheim (DE); Rolf Schneider, Gründau-Rothenbergen (DE); Olivier Zehnacker, Recklinghausen (DE); Marc-Christoph Schneider, Darmstadt (DE)

(73) Assignee: Evonik Degussa GmbH, Essen (DE)

( * ) Notice: Subject to any disclaimer, the term of this patent is extended or adjusted under 35 U.S.C. 154(b) by 1 day.

(21) Appl. No.: 13/514,167

(22) PCT Filed: Nov. 24, 2010

(86) PCT No.: PCT/EP2010/068090
§ 371 (c)(1), (2), (4) Date: Jun. 6, 2012

(87) PCT Pub. No.: WO2011/069822
PCT Pub. Date: Jun. 16, 2011

(65) Prior Publication Data
US 2012/0247144 A1 Oct. 4, 2012

(30) Foreign Application Priority Data

Dec. 7, 2009 (DE) .......................... 10 2009 047 564

(51) Int. Cl.
*C09K 5/10* (2006.01)
(52) U.S. Cl.
USPC .......................................................... 252/69
(58) Field of Classification Search
USPC .......................................................... 252/69
See application file for complete search history.

(56) References Cited

U.S. PATENT DOCUMENTS

| | | |
|---|---|---|
| 1,882,258 A | 10/1932 | Randel |
| 2,516,625 A | 7/1950 | Haury |
| 2,601,673 A | 6/1952 | McMillan et al. |
| 2,802,344 A | 8/1957 | Witherell |
| 3,276,217 A | 10/1966 | Bourne et al. |
| 3,580,759 A | 5/1971 | Albertson et al. |
| 3,609,087 A | 9/1971 | Chi et al. |
| 4,106,904 A | 8/1978 | Oude Alink et al. |
| 4,152,900 A | 5/1979 | Chopra et al. |

(Continued)

FOREIGN PATENT DOCUMENTS

| | | |
|---|---|---|
| DE | 400 488 | 8/1924 |
| DE | 633 146 | 7/1936 |

(Continued)

OTHER PUBLICATIONS

English language abstract for DE 10 2009 000 543 listed as document B1 above.

(Continued)

*Primary Examiner* — John Hardee
(74) *Attorney, Agent, or Firm* — Law Office of: Michael A. Sanzo, LLC

(57) ABSTRACT

The invention relates to an operating medium for an absorption refrigeration device, comprising 5 to 30 wt % water and 65 to 95 wt % of a sorption agent comprising lithium bromide and at least one ionic liquid and wherein the sorption agent comprises ionic liquid and lithium bromide in a weight ratio of 0.5:1 to 5:1, having a lower friction coefficient compared to an operating medium comprising water and lithium bromide.

20 Claims, 3 Drawing Sheets

(56) References Cited

U.S. PATENT DOCUMENTS

| | | |
|---|---|---|
| 4,152,901 A | 5/1979 | Munters |
| 4,201,721 A | 5/1980 | Hallgren |
| 4,251,494 A | 2/1981 | Say |
| 4,360,363 A | 11/1982 | Ferrin et al. |
| 4,466,915 A | 8/1984 | Lai |
| 4,701,530 A | 10/1987 | Swearingen et al. |
| 4,714,597 A | 12/1987 | Trevino |
| 5,016,445 A | 5/1991 | Wehr |
| 5,126,189 A | 6/1992 | Tanny et al. |
| 5,186,010 A | 2/1993 | Wehr |
| 5,873,260 A | 2/1999 | Linhardt et al. |
| 6,117,963 A | 9/2000 | Boinowitz et al. |
| 6,130,347 A | 10/2000 | Julius et al. |
| 6,155,057 A | 12/2000 | Angell et al. |
| 6,184,433 B1 | 2/2001 | Harada et al. |
| 6,727,015 B1 | 4/2004 | Putter et al. |
| 7,419,646 B2 | 9/2008 | Cadours et al. |
| 7,435,318 B2 | 10/2008 | Arlt et al. |
| 7,827,820 B2 | 11/2010 | Weimer et al. |
| 8,069,687 B2 | 12/2011 | Jork et al. |
| 8,318,117 B2 | 11/2012 | Lichtfers et al. |
| 8,357,344 B2 | 1/2013 | Bouillon et al. |
| 8,500,867 B2 | 8/2013 | Seiler et al. |
| 8,500,892 B2 | 8/2013 | Seiler et al. |
| 8,506,839 B2 | 8/2013 | Shiflett et al. |
| 2004/0133058 A1 | 7/2004 | Arlt et al. |
| 2005/0070717 A1 | 3/2005 | Wasserscheid et al. |
| 2005/0129598 A1 | 6/2005 | Chinn |
| 2005/0245769 A1 | 11/2005 | Kohler et al. |
| 2006/0104877 A1 | 5/2006 | Cadours et al. |
| 2006/0150665 A1 | 7/2006 | Weimer et al. |
| 2006/0197053 A1 | 9/2006 | Shiflett et al. |
| 2006/0251961 A1 | 11/2006 | Olbert et al. |
| 2007/0144186 A1 | 6/2007 | Shiflett et al. |
| 2007/0264180 A1 | 11/2007 | Carrette et al. |
| 2007/0286783 A1 | 12/2007 | Carrette et al. |
| 2008/0028777 A1 | 2/2008 | Boesmann et al. |
| 2008/0283383 A1 | 11/2008 | Ruffert et al. |
| 2009/0029121 A1 | 1/2009 | Hammermann et al. |
| 2009/0199709 A1 | 8/2009 | Rojey et al. |
| 2010/0011958 A1 | 1/2010 | Cadours et al. |
| 2010/0029519 A1 | 2/2010 | Schwab et al. |
| 2010/0095703 A1 | 4/2010 | Jork et al. |
| 2010/0104490 A1 | 4/2010 | Bouillon et al. |
| 2010/0288126 A1 | 11/2010 | Agar et al. |
| 2010/0326126 A1 | 12/2010 | Seiler |
| 2011/0000236 A1 | 1/2011 | Seiler |
| 2011/0081287 A1 | 4/2011 | Bouillon et al. |
| 2012/0011886 A1* | 1/2012 | Shiflett et al. .................. 62/476 |
| 2012/0017762 A1 | 1/2012 | Seiler |
| 2012/0080644 A1 | 4/2012 | Seiler |
| 2012/0308458 A1 | 12/2012 | Seiler |
| 2013/0031930 A1 | 2/2013 | Seiler et al. |
| 2013/0031931 A1 | 2/2013 | Seiler et al. |
| 2013/0118350 A1 | 5/2013 | Rolker et al. |
| 2013/0219949 A1 | 8/2013 | Seiler et al. |

FOREIGN PATENT DOCUMENTS

| | | |
|---|---|---|
| DE | 36 23 680 A1 | 1/1988 |
| DE | 266 799 A1 | 4/1989 |
| DE | 195 11 709 | 10/1996 |
| DE | 103 33 546 | 2/2005 |
| DE | 10 2004 053 167 | 5/2006 |
| DE | 10 2005 013 030 | 9/2006 |
| DE | 10 2006 036228 A1 | 2/2008 |
| DE | 10 2009 000 543 | 8/2010 |
| EP | 0 033 529 A1 | 1/1981 |
| EP | 0 302 020 | 2/1989 |
| EP | 2 087 930 A1 | 8/2009 |
| EP | 2 093 278 A1 | 8/2009 |
| FR | 2 898 284 A1 | 9/2007 |
| FR | 2 900 841 A1 | 11/2007 |
| FR | 2 900 842 A1 | 11/2007 |
| JP | 61-129019 | 6/1986 |
| JP | 1-134180 | 5/1989 |
| JP | 2-298767 | 12/1990 |
| JP | 4-268176 | 9/1992 |
| JP | 6-307730 | 11/1994 |
| JP | 7-167521 | 7/1995 |
| JP | 2001-219164 | 8/2001 |
| JP | 2004-44945 | 2/2004 |
| JP | 2006-239516 | 9/2006 |
| WO | WO 93/13367 | 7/1993 |
| WO | WO 02/074718 | 9/2002 |
| WO | WO 03/074494 | 9/2003 |
| WO | WO 2004/104496 | 12/2004 |
| WO | WO 2005/113702 | 12/2005 |
| WO | WO 2006/084262 | 8/2006 |
| WO | WO 2006/134015 | 12/2006 |
| WO | WO 2007/070607 | 6/2007 |
| WO | WO 2008/015217 | 2/2008 |
| WO | WO 2009/097930 | 8/2009 |
| WO | WO 2009/098155 | 8/2009 |
| WO | WO 2009/156271 | 12/2009 |
| WO | WO 2010/089257 | 8/2010 |
| WO | WO 2012/062656 | 5/2012 |
| WO | WO 2012/062830 | 5/2012 |
| WO | WO 2012/168067 | 12/2012 |
| WO | WO 2012/168094 | 12/2012 |
| WO | WO 2012/168095 | 12/2012 |
| WO | WO 2013/050230 | 4/2013 |
| WO | WO 2013/050242 | 4/2013 |

OTHER PUBLICATIONS

English language abstract for WO 2012/168067 listed as document B2 above.

English language abstract for WO 2012/168094 listed as document B3 above.

English language abstract for WO 2012/168095 listed as document B4 above.

English language abstract for EP 2 093 278 A1 listed as document B1 above.

English language abstract for EP 2 087 930 A1 listed as document B2 above.

English language abstract for WO 2012/062656 listed as document B3 above.

Domanska, et al., Solubility of 1-Alkyl-3-ethylimidazolium-Based Ionic Liquids in Water and 1-Octanol, *J. Chem. Eng. Data* 53:1126-1132 (Apr. 2008).

Liu, et al., The physical properties of aqueous solution of room-temperature ionic liquids based on imidazolium:Database and Evaluation, *J. Mol. Liquids* 140:68-72 (Jan. 2008).

Zhou, The Vapor Surfactant Theory of Absorption and Condensation Enhancement, *Proc. Int. Sorption Heat Pump Conference*, Sep. 24-27, 2002.

English language translation of the International Search Report for corresponding PCT/EP2010/068090 filed Nov. 24, 2010.

English language translation of the Written Opinion of the International Searching Authority for corresponding PCT/EP2010/068090 filed Nov. 24, 2010.

English language translation of the International Preliminary Report on Patentability for corresponding PCT/EP2010/068090 filed Nov. 24, 2010.

Brennecke, et al., "Ionic Liquids. Innovative Fluids for Chemical Processing," *AIChE Journal* 47(11):2384-2389 (2001).

Chua, et al., "Improved Thermodynamic Property Fields of LiBr—$H_2O$ Solution," *International Journal of Refrigeration* 23:412-429 (2000).

De Lucas, et al., "Vapor Pressures, Densities, and Viscosities of the (Water + Lithium Bromide + Lithium Formate) System and (Water + Lithium Bromide + Potassium Formate) System," *Journal of Chemical and Engineering Data, American Chemical Society*, US 48(1):18-22 (2003).

De Lucas, et al., "Absorption of Water Vapor into Working Fluids for Absorption Refrigeration Systems," *Industrial & Engineering Chemistry Research, American Chemical Society*, US 46(1):345-350 (2007).

(56) References Cited

OTHER PUBLICATIONS

Galán, et al., "Solvent Properties of Functionalized Ionic Liquids for $CO_2$ Absorption," *IChemE* 85(A1):31-39 (2007).
Glebov, et al., "Experimental Study of Heat Transfer Additive Influence on the Absorption Chiller Performance," *International Journal of Refrigeration* 25:538-545 (2002).
Kim, et al., "Surface tension and viscosity of 1-butyl-3-methylimidazolium iodide and 1-butyl-3-methylimidazolium tetrafluoroborate, and solubility of lithium bromide+1-butyl-3-methylimidazolium bromide in water," *Korean J. Chem. Eng.* 23(1):113-116 (2006).
Kim, et al., "Performance Evaluation of Absorption Chiller Using $LiBr+H_2N(CH_2)_2OH+H_2O$, $LiBr+HO(CH_2)_3OH+H_2O$, and $LiBr+(HOCH_2CH_2NH+H_2O$ as Working Fluids," *Applied Thermal Engineering* 19:217-225 (1999).
Kim, et al., "Refractive Index and Heat Capacity of 1-Butyl-3-Methylimidazolium Bromide and 1-Butyl-3-Methylimidazolium Tetrafluoroborate, and Vapor Pressure of Binary Systems for 1-Butyl-3-Methylimidazolium Tetrafluoroborate-Trifluoroethanol," *Fluid Phase Equilibria* 218:215-220 (2004).
Li, et al., "Correlation and Prediction of the Solubility of $CO_2$ and $H_2S$ in an Aqueous Solution of 2-Piperidineethanol and Sulfolane," *Ind. Eng. Chem. Res.* 37:3098-3104 (1998).
Mitsubishi Heavy Industries, Ltd., "Flue Gas $CO_2$ Recovery Technology and Its Application to EOR: an Effective Strategy for Addressing the Issues of Global Warming and Peaking Oil Supply," vol. 44, p. 20-23 (2007).
English counterpart of Mitsubishi Heavy Industries, Ltd., "Flue Gas $CO_2$ Recovery Technology and Its Application to EOR: an Effective Strategy for Addressing the Issues of Global Warming and Peaking Oil Supply," vol. 44, p. 20-23 (2007) listed as document C31 above.
Rolker, et al., "Abtrennung von Kohlendioxid aus Rauchgasen mittels Absorption," *Chemie Ingenieur Technik* 78:416-424 (2006).
Wu, et al., "Novel Ionic Liquid Thermal Storage for Solar Thermal Electric Power Systems," *Proceeding of Solar Forum. Solar Energy: The Power to Choose* Apr. 21-25, 2001.
Yoon, et al., "Cycle Analysis of Air-Cooled Absorption Chiller Using a New Working Solution," *Energy* 24:795-809 (1999).
Zhang, et al., "Screening of ionic Liquids to Capture $CO_2$ by COSMO-RS and Experiments," *AIChE Journal* 54(10):2171-2728 (Oct. 2008).
Ziegler, et al., "Heat-Transfer Enhancement by Additives," *International Journal of Refrigeration* 19:301-309 (1996).
Ziegler, et al., "Multi-effect absorption chillers," *Rev. Int. Froid* 16(5):301-311 (1993).
English language translation of abstract for Rolker document listed as C33 above.
U.S. Appl. No. 13/641,591, filed Oct. 16, 2012, Seiler.
U.S. Appl. No. 13/641,692, filed Oct. 16, 2012, Seiler.
U.S. Appl. No. 13/675,979, filed Nov. 13, 2012, Rolker.
English language abstract for WO 2013/050230 listed as document B5 above and published on Apr. 11, 2013.
English language abstract for WO 2013/050242 listed as document B6 above and published on Apr. 11, 2013.
Wasserscheid, et al., "Ionische Flüssigkeiten—neue„Lösungen für die Übergangsmetallkatalyse," *Angewandte Chemie* 112(21):3926-3945 (200).
Wasserscheid, et al., "Ionic Liquids—New "Solutions" for Transition Metal Catalysis," *Angew. Chem. Int. Ed.* 39:3772-3789 (2000).
Ziegler, et al., "Recent developments and future prospects of sorption heat pump systems," *Int. J. Therm. Sci.* 38:191-208 (1999).
U.S. Appl. No. 13/883,573, filed May 5, 2013, Seiler.
U.S. Appl. No. 13/884,840, filed May 31, 2013, Seiler.
U.S. Appl. No. 13/910,014, filed Jun. 4, 2013, Seiler.
English language abstract for DD 266 799 A1 listed as document B1 above.
English language text for DE 400 488 listed as document B2 above.
English language text for DE 633 146 listed as document B3 above.
English language abstract for DE 36 23 680 listed as document B4 above.
English language abstract for DE 195 11 709 listed as document B5 above.
English language abstract for DE 103 33 546 listed as document B6 above.
English language abstract for DE 10 2004 053 167 listed as document B7 above.
English language abstract for EP 0 033 529 A1 listed as document B10 above.
English language abstract for FR 2 900 841 A1 listed as document B13 above.
English language abstract for JP 61-129019 listed as document B15 above.
English language abstract for JP 2-298767 listed as document B16 above.
English language abstract for JP 4-268176 listed as document B17 above.
English language abstract for JP 7-167521 listed as document B18 above.
English language abstract for WO 93/13367 listed as document B19 above.
English language abstract for WO 2008/015217 listed as document B26 above.
English language abstract for WO 2009/098155 listed as document B27 above.
English language abstract for WO 2012/062830 listed as document B30 above.
English language abstract for JP 1-134180 listed as document B1 above and published on May 26, 1989.
English language abstract for JP 6-307730 listed as document B2 above and published on Nov. 1, 1994.
English language abstract for JP 2001-219164 listed as document B3 above and published on Aug. 14, 2001.
English language abstract for JP 2004-44945 listed as document B4 above and published on Feb. 12, 2004.
English language abstract for JP 2006-239516 listed as document B5 above and published on Sep. 14, 2006.
Perez-Blanco, "A Model of an Ammonia-Water Falling Film Absorber," *ASHRAE Transactions* vol. 94, pp. 467-483, 1988; (Presented at the 1988 winter meeting in Dallas Texas of the American Society of Heating, Refrigerating and Air-Conditioning Engineers, Inc).

* cited by examiner

OPERATING MEDIUM FOR AN ABSORPTION REFRIGERATION DEVICE

CROSS REFERENCE TO RELATED APPLICATIONS

The present application is US national stage of international application, PCT/EP2010/068090 which had an international filing date of Nov. 24, 2010, and which was published in German under PCT Article 21(2) on Jun. 16, 2011. Priority is claimed to German application DE 10 2009 047 564.8, filed on Dec. 7, 2009.

The invention is directed to a working medium for an absorption refrigeration machine giving reduced friction.

Classical refrigeration machines are based on a circuit in which a refrigerant is vaporized and cooling is achieved by the heat of vaporization taken up by the refrigerant. The vaporized refrigerant is then brought to a higher pressure by means of a compressor and condensed at a higher temperature than that at which vaporization has occurred, with the heat of vaporization being liberated again. The liquefied refrigerant is subsequently depressurized again to the pressure of the vaporizer.

Classical refrigeration machines have the disadvantage that they consume a great deal of mechanical energy for compression of the gaseous refrigerant. In contrast, absorption refrigeration machines have a reduced mechanical energy requirement. Absorption refrigeration machines have a sorption medium, an absorber and a desorber in addition to the refrigerant, the vaporizer and the condenser of a classical refrigeration machine. The vaporized refrigerant is absorbed at the pressure of the vaporization in the sorption medium in the absorber and is subsequently desorbed again from the sorption medium in the desorber at the higher pressure of the condensation by supply of heat. Compression of the liquid working medium composed of refrigerant and sorption medium requires less mechanical energy than compression of the refrigerant vapour in a classical refrigeration machine; the consumption of mechanical energy is replaced by the thermal energy used for desorption of the refrigerant.

The major part of absorption refrigeration machines used industrially employs a working medium containing water as refrigerant and lithium bromide as sorption medium. However, this working medium has a series of disadvantages which stand in the way of wide use of absorption refrigeration machines. To achieve a high efficiency, a maximum portion of the refrigerant has to be desorbed from the working medium in the desorber. However, for a working medium composed of water and lithium bromide, the water concentration must not fall below 35-40% by weight since crystallization of lithium bromide and thus solidification of the working medium can otherwise occur. A working medium composed of water and lithium bromide also has a corrosive effect on many materials and results in high friction and thus accelerated wear on moving parts of the pump required for conveying the working medium between absorber and desorber.

WO 2006/134015 describes, in Example VII a), the use of the ionic liquids 1-ethyl-3-methylimidazolium methylsulphonate, 1-ethyl-3-methylimidazolium acetate and 1-ethyl-3-methyl-imidazolium hydroxide as additives for a working medium composed of lithium bromide and water in order to reduce the crystallization temperature of the sorption medium. However, what proportions of water, lithium bromide and ionic liquid should be present in the working medium is not disclosed.

In Korean J. Chem. Eng., 23 (2006) 113-116, K.-S. Kim et al. propose working media which are composed of water, lithium bromide and the ionic liquid 1-butyl-3-methyl-imidazolium bromide and in which the lithium bromide and the ionic liquid are present in a weight ratio of from 4:1 to 7:1. In these working media, the ionic liquid acts as anticrystallization additive which increases the solubility of lithium bromide and reduces the crystallization temperature.

However, the working media proposed by Kim et al. give an increased coefficient of friction compared to a working medium composed of water and lithium bromide, so that the problem of high friction cannot be solved thereby.

It has now surprisingly been found that working media comprising water, lithium bromide and an ionic liquid having a significantly reduced coefficient of friction compared to a working medium composed of water and lithium bromide can be produced when the water content and the weight ratio of ionic liquid to lithium bromide are selected in a suitable range.

The invention accordingly provides a working medium for an absorption refrigeration machine, which comprises from 5 to 30% by weight of water and from 65 to 95% by weight of a sorption medium consisting of lithium bromide and at least one ionic liquid, where the sorption medium contains ionic liquid and lithium bromide in a weight ratio of from 0.5:1 to 5:1.

The invention also provides an absorption refrigeration machine comprising an absorber, a desorber, a vaporizer, a condenser, a circulation pump and a working medium which is conveyed in a circuit via absorber and desorber by means of the circulation pump, wherein the working medium fed to the desorber has the composition according to the invention.

The working medium of the invention comprises from 5 to 30% by weight of water and from 65 to 95% by weight of a sorption medium consisting of lithium bromide and at least one ionic liquid. The working medium of the invention preferably comprises from 10 to 30% by weight of water. Water and sorption medium together preferably make up more than 90% by weight of the working medium, particularly preferably more than 95% by weight.

The sorption medium of the working medium of the invention comprises lithium bromide and at least one ionic liquid. Here, the term ionic liquid refers to a salt or a mixture of salts of anions and cations, with the salt or the mixture of salts having a melting point of less than 100° C. The term ionic liquid here refers to salts or mixture of salts which are free of nonionic materials or additives. The ionic liquid preferably consists of one or more salts of organic cations with organic or inorganic anions. Mixtures of a plurality of salts having different organic cations and the same anion are particularly preferred.

Suitable organic cations are, in particular, cations of the general formulae (I) to (V):

 (I)

 (II)

 (III)

 (IV)

 (V)

where $R^1$, $R^2$, $R^3$, $R^4$ are identical or different and are each hydrogen, a linear or branched aliphatic or olefinic hydrocarbon radical having from 1 to 30 carbon atoms, a cycloaliphatic or cycloolefinic hydrocarbon radical having from 5 to 40 carbon atoms, an aromatic hydrocarbon radical having from 6 to 40 carbon atoms, an alkylaryl radical having from 7 to 40 carbon atoms, a linear or branched aliphatic or olefinic hydrocarbon radical which has from 2 to 30 carbon atoms and is interrupted by one or more —O—, —NH—, —NR'—, —O—C(O)—, —(O)C—O—, —NH—C(O)—, —(O)C—NH—, —(CH$_3$)N—C(O)—, —(O)C—N(CH$_3$)—, —S(O$_2$)—O—, —O—S(O$_2$)—, —S(O$_2$)—NH—, —NH—S(O$_2$)—, —S(O$_2$)—N(CH$_3$)— or —N(CH$_3$)—S(O$_2$)— groups, a linear or branched aliphatic or olefinic hydrocarbon radical which has from 1 to 30 carbon atoms and is terminally functionalized by OH, OR', NH$_2$, N(H)R' or N(R')$_2$ or a polyether radical of the formula —(R$^5$—O)$_n$—R$^6$ having a block or random structure, R' is an aliphatic or olefinic hydrocarbon radical having from 1 to 30 carbon atoms, R$^5$ is a linear or branched hydrocarbon radical having from 2 to 4 carbon atoms, n is from 1 to 200, preferably from 2 to 60, R$^6$ is hydrogen, a linear or branched aliphatic or olefinic hydrocarbon radical having from 1 to 30 carbon atoms, a cycloaliphatic or cycloolefinic hydrocarbon radical having from 5 to 40 carbon atoms, an aromatic hydrocarbon radical having from 6 to 40 carbon atoms, an alkylaryl radical having from 7 to 40 carbon atoms or a radical —C(O)—R$^7$, R$^7$ is a linear or branched aliphatic or olefinic hydrocarbon radical having from 1 to 30 carbon atoms, a cycloaliphatic or cycloolefinic hydrocarbon radical having from 5 to 40 carbon atoms, an aromatic hydrocarbon radical having from 6 to 40 carbon atoms or an alkylaryl radical having from 7 to 40 carbon atoms, where at least one and preferably each of the radicals R$^1$, R$^2$, R$^3$ and R$^4$ is different from hydrogen.

Cations of the formulae (I) to (V) in which the radicals R$^1$ and R$^3$ together form a 4- to 10-membered, preferably 5- to 6-membered, ring are likewise suitable.

Heteroaromatic cations having at least one quaternary nitrogen atom bearing a radical R$^1$ as defined above in the ring, preferably derivatives of pyrrole, pyrazole, imidazole, oxazole, isoxazole, thiazole, isothiazole, pyridine, pyrimidine, pyrazine, indole, quinoline, isoquinoline, cinnoline, quinoxaline or phthalazine substituted on the nitrogen atom, are likewise suitable.

Suitable inorganic anions are, in particular, tetrafluoroborate, hexafluorophosphate, nitrate, sulphate, hydrogensulphate, phosphate, hydrogenphosphate, dihydrogen-phosphate, hydroxide, carbonate, hydrogencarbonate, thiocyanate, dicyanamide and the halides, preferably chloride or bromide.

Suitable organic anions are, in particular R$^a$OSO$_3^-$, R$^a$SO$_3^-$, R$^a$OPO$_3^{2-}$, (R$^a$O)$_2$PO$_2^-$, R$^a$PO$_3^{2-}$, R$^a$COO$^-$, (R$^a$CO)$_2$N$^-$, (R$^a$SO$_2$)$_2$N$^-$ and C(CN)$_2^-$, where R$^a$ is a linear or branched aliphatic hydrocarbon radical having from 1 to 30 carbon atoms, a cycloaliphatic hydrocarbon radical having from 5 to 40 carbon atoms, an aromatic hydrocarbon radical having from 6 to 40 carbon atoms, an alkylaryl radical having from 7 to 40 carbon atoms or a linear or branched perfluoroalkyl radical having from 1 to 30 carbon atoms.

In a preferred embodiment, the ionic liquid comprises one or more 1,3-dialkylimidazolium salts, where the alkyl groups are particularly preferably selected independently from among methyl, ethyl, n-propyl, n-butyl and n-hexyl. Particularly preferred ionic liquids are salts of one or more of the cations 1,3-dimethylimidazolium, 1-ethyl-3-methylimidazolium, 1-(n-butyl)-3-methylimidazolium, 1-(n-butyl)-3-ethylimidazolium, 1-(n-hexyl)-3-methylimidazolium, 1-(n-hexyl)-3-ethylimidazolium, 1-(n-hexyl)-3-butylimidazolium with one of the anions chloride, bromide, acetate, methylsulphate, ethylsulphate, dimethylphosphate or methylsulphonate, in particular with chloride or bromide.

In a further preferred embodiment, the ionic liquid comprises one or more quaternary ammonium salts having a monovalent anion and cations of the general formula (I) in which R$^1$ is an alkyl radical having from 1 to 20 carbon atoms, R$^2$ is an alkyl radical having from 1 to 4 carbon atoms, R$^3$ is a radical (CH$_2$CHRO)$_n$—H where n is from 1 to 200 and R=H or CH$_3$ and R$^4$ is an alkyl radical having from 1 to 4 carbon atoms or a radical (CH$_2$CHRO)$_n$—H where n is from 1 to 200 and R=H or CH$_3$.

Particularly preferred anions are chloride, acetate, methylsulphate, ethylsulphate, dimethylphosphate or methylsulphonate.

Processes for preparing the ionic liquids are known to those skilled in the art from the prior art.

Preference is given to using ionic liquids which are miscible in any ratio with water, stable to hydrolysis and thermally stable up to a temperature of 150° C. Hydrolysis-stable ionic liquids show less than 5% degradation by hydrolysis in a mixture with 50% by weight of water on storage at 80° C. for 8000 h.

The sorption medium of the working medium of the invention contains ionic liquid and lithium bromide in a weight ratio of from 0.5:1 to 5:1. The weight ratio is preferably from 0.5:1 to 2:1 and particularly preferably from 1:1 to 2:1.

The ionic liquid and the weight ratio of ionic liquid to lithium bromide in the sorption medium are preferably selected so that the working medium remains as a single phase at a desorption of water down to a water content of the working medium of 10% by weight and at an absorption of water up to a water content of the working medium of 30% by weight. The ionic liquid and the weight ratio of ionic liquid to lithium bromide in the sorption medium are particularly preferably selected so that the working medium remains as a single phase at a desorption of water down to a water content of the working medium of 5% by weight and at an absorption of water up to a water content of the working medium of 30% by weight.

The working medium can contain further additives in addition to the sorption medium and water.

The working medium preferably contains one or more corrosion inhibitors as additive. Here, it is possible to use all nonvolatile corrosion inhibitors which are known from the prior art as being suitable for the materials used in the absorption refrigeration machine.

Further preferred additives are wetting-promoting additives which can be used in an amount of from 0.01 to 10% by weight based on the working medium. Preference is given to using the wetting-promoting additives described in WO 2009/097930 on page 6, line 14 to page 8, line 6, particularly preferably the compounds described in WO 2009/097930 on page 7, line 7 to page 8, line 6.

An absorption refrigeration machine according to the invention comprises an absorber, a desorber, a vaporizer, a condenser, a circulation pump and a working medium which is conveyed in a circuit via absorber and desorber by means of the circulation pump, wherein the working medium fed to the desorber has the abovementioned composition according to the invention.

The working media of the invention show a significant reduction in the coefficient of friction, especially in the region of mixed friction in the Stribeck curve, compared to working media composed of water and lithium bromide or of water, lithium bromide and 1-butyl-3-methylimidazolium bromide which are known from the prior art. The working media of the invention thus allow the use of pumps whose bearings come into contact with the working medium without special materials e.g. ceramic materials, being necessary for this purpose. The absorption refrigeration machines of the invention display reduced wear of the circulation pump compared to absorption refrigeration machines of the prior art.

The working media of the invention can be used not only in absorption refrigeration machines in which the uptake of heat by the coolant in the vaporizer is utilized for cooling but also in absorption heat pumps in which the heat liberated in the absorber and in the condenser is used for heating.

The following examples illustrate the invention but do not restrict the subject matter of the invention.

EXAMPLES

Coefficients of friction μ (traction coefficient) were determined for working media according to the invention and working media according to the prior art at 40 and 70° C. with a friction testing instrument MTM2 from PCS Instruments at different speed differences between the friction surfaces. Measurements were carried out using a ball having a diameter of 19.05 mm and a disc having a diameter of 46 mm as friction partners, both made of polished stainless steel 1.3505 having a surface roughness of 0.01 μm, at a force of 30 N, a contact pressure of 947.8 MPa and a sliding/rolling ratio of 50%.

Table 1 shows the composition of the working media investigated in Examples 1 to 6. Example 1 is a working medium composed of water and lithium bromide without a proportion of ionic liquid, as is used in commercial absorption refrigeration machines. Examples 2 and 3 are working media according to the prior art from K.-S. Kim et al., in Korean J. Chem. Eng., 23 (2006) 113-116, having a weight ratio of lithium bromide to ionic liquid of 4. Examples 4 to 6 are working media according to the invention with 1-butyl-3-methylimidazolium bromide as ionic liquid.

TABLE 1

Composition of the working media investigated

| Example | Weight proportion in % by weight | | | Weight ratio of |
|---|---|---|---|---|
| | Water | BMIMBr** | LiBr | BMIMBr:LiBr |
| 1* | 37 | 0 | 63 | 0 |
| 2* | 37 | 12.6 | 50.4 | 0.25:1 |
| 3* | 25 | 15 | 60 | 0.25:1 |
| 4 | 25 | 25 | 50 | 0.5:1 |
| 5 | 25 | 50 | 25 | 2:1 |
| 6* | 25 | 75 | 0 | |
| 7 | 5 | 63.3 | 31.7 | 2:1 |
| 8 | 30 | 23.3 | 46.7 | 0.5:1 |

*not according to the invention
**BMIMBr = 1-butyl-3-methylimidazolium bromide

Both figures show that the working media of Examples 2 and 3 according to the prior art from K.-S. Kim et al. give a higher coefficient of friction than the working medium without ionic liquid as per Example 1.

Figure 1:
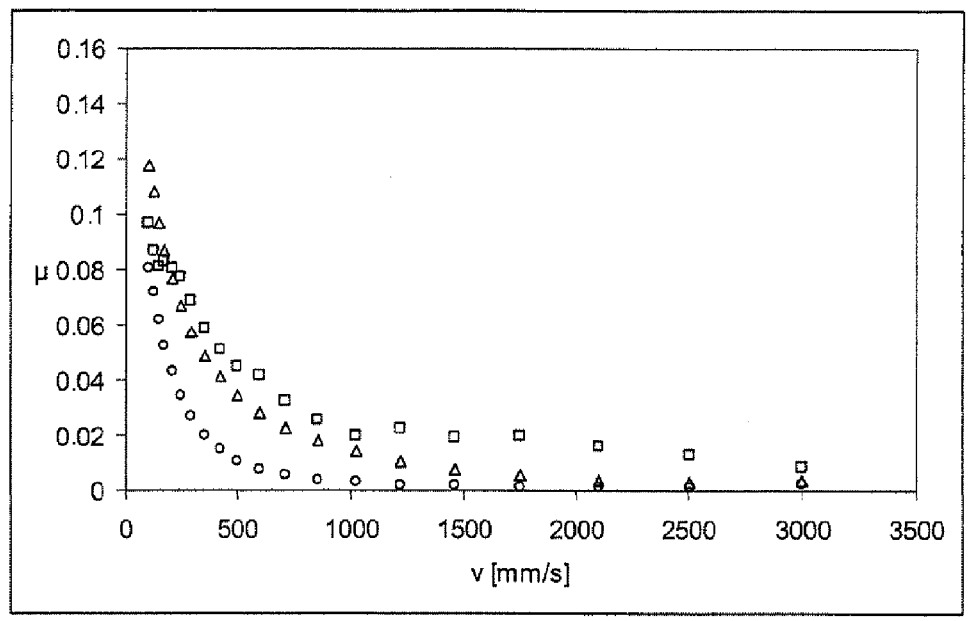
In FIG. 1, the Stribeck curve (coefficient of friction μ versus speed difference v between the friction surfaces in mm/s) at 40° C. is plotted for each of the working media of Examples 1 to 3 (Example 1: open circles; Example 2: open triangles; Example 3: open squares).
Figure 2:
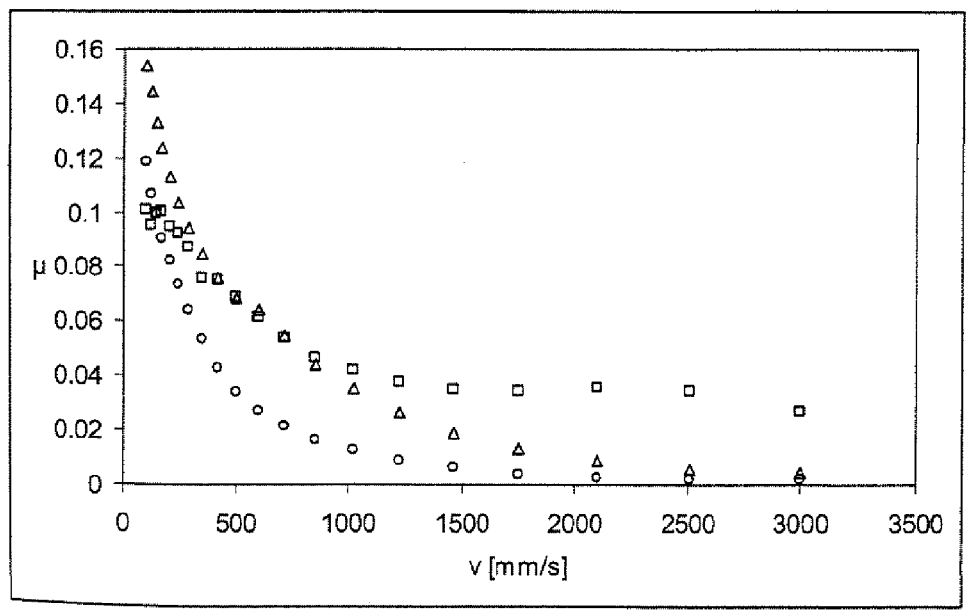
FIG. 2 shows the corresponding Stribeck curves at 70° C.
Figure 3:
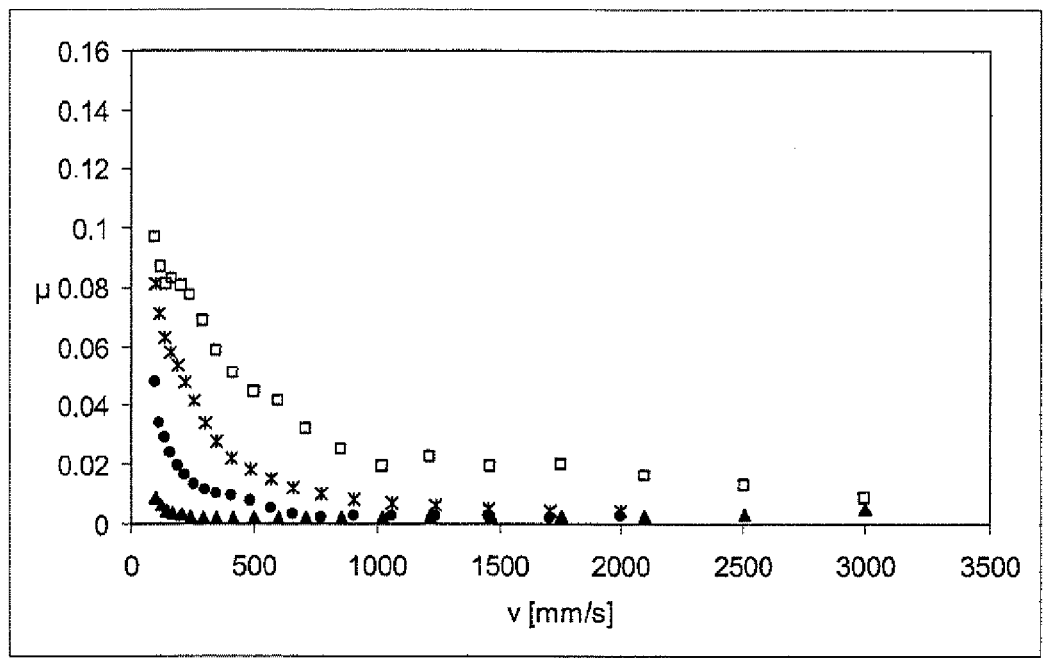
Figure 4:
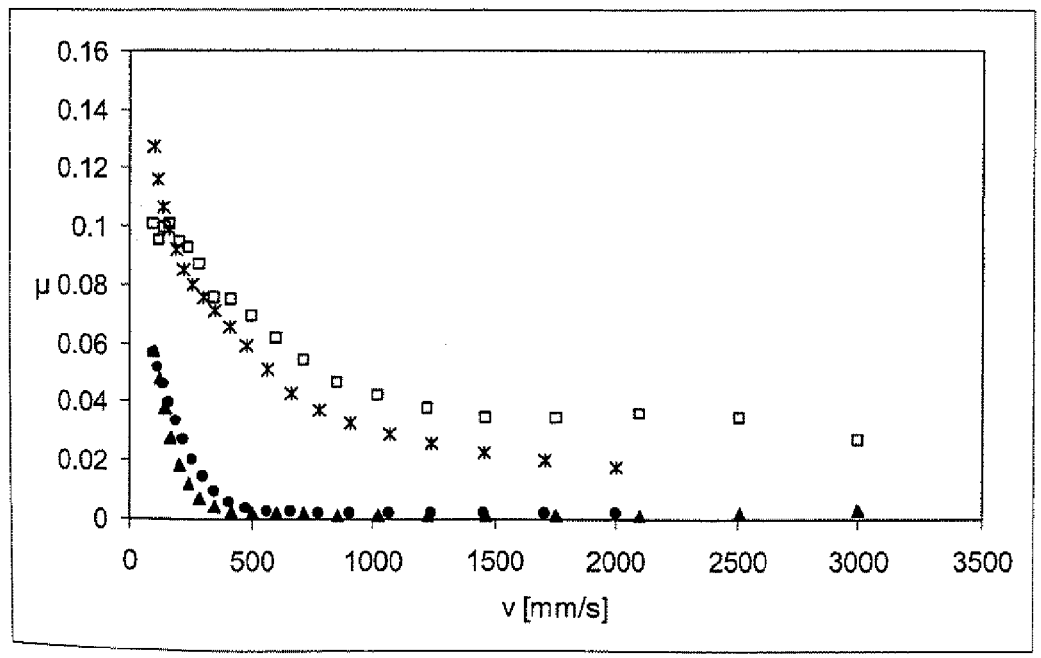

In FIG. 3, the Stribeck curve (coefficient of friction μ versus speed difference v between the friction surfaces in mm/s) at 40° C. is plotted for each of the working media of Examples 3 to 6 (Example 3: open squares, Example 4: solid circles, Example 5: solid triangles, Example 6: asterisks). FIG. 4 shows the corresponding Stribeck curves at 70° C.

Both figures show that the working media according to the invention of Examples 4 and 5 give a coefficient of friction which is lower than that for the working media known from K.-S. Kim et al. and is also below the coefficient of friction of the working medium without ionic liquid as per Example 1 and below the coefficient of friction of the working medium without lithium bromide as per Example 6.

Figure 5:
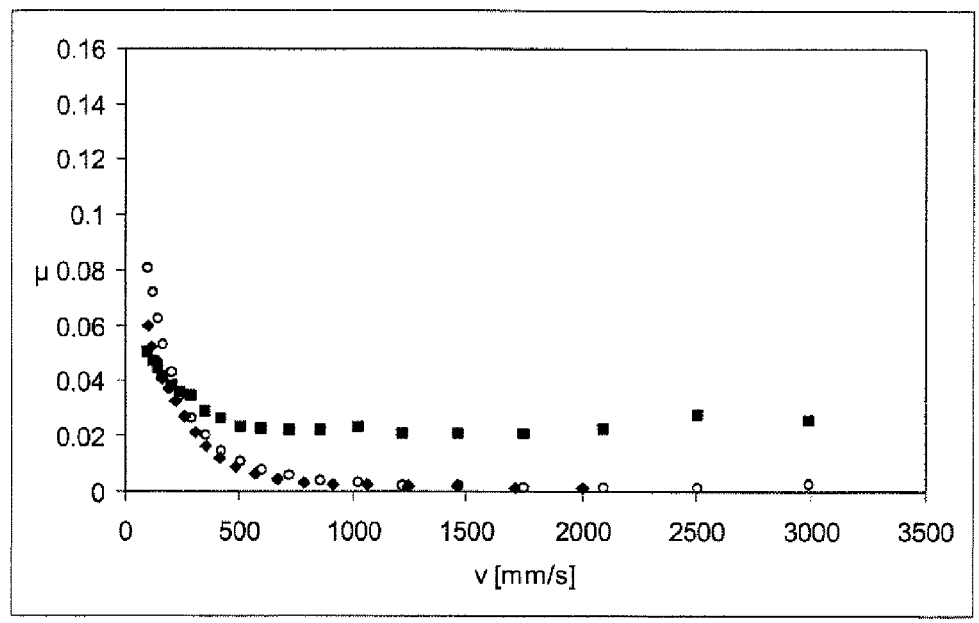
Figure 6:
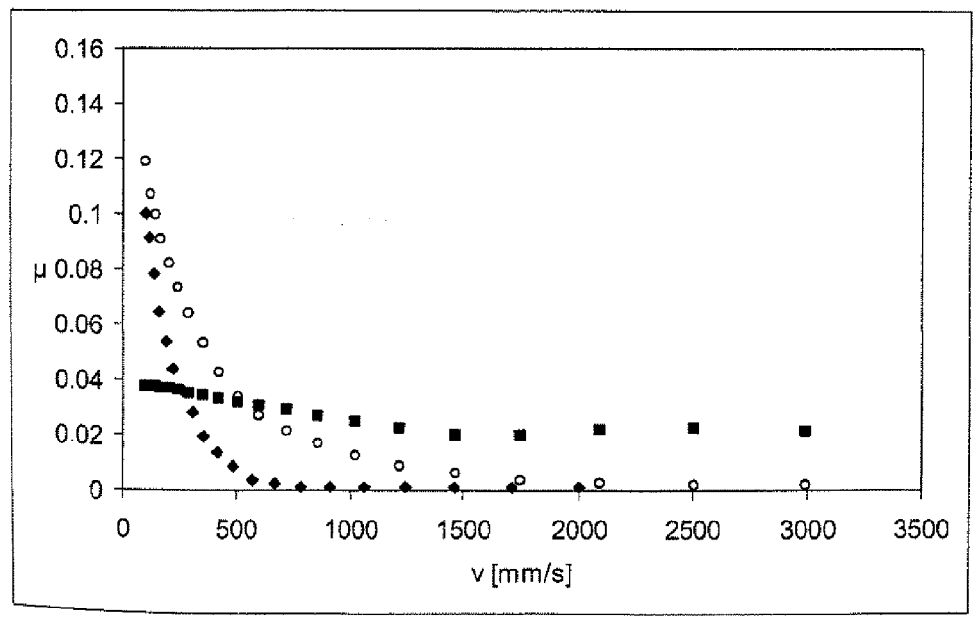

In FIG. 5, the Stribeck curve (coefficient of friction μ versus speed difference v between the friction surfaces in mm/s) at 40° C. is plotted for the working media of Examples 1, 7 and 8 (Example 1: open circles; Example 7: solid squares, Example 8: solid diamonds). FIG. 6 shows the corresponding Stribeck curves at 70° C.

Both figures show that a working medium according to the invention gives a low coefficient of friction in the region of mixed friction, i.e. at low speed differences between the friction surfaces, which is below the coefficient of friction of the working medium without ionic liquid as per Example 1 even at a water content of 5% by weight or 30% by weight.

The invention claimed is:

1. A working medium for an absorption refrigeration machine, comprising from 5 to 30% by weight of water and from 65 to 95% by weight of a sorption medium consisting of lithium bromide and at least one ionic liquid, where the sorption medium contains ionic liquid and lithium bromide in a weight ratio of from 0.5:1 to 5:1.

2. The working medium of claim 1, wherein the sorption medium contains ionic liquid and lithium bromide in a weight ratio of from 0.5:1 to 2:1.

3. The working medium of claim 2, wherein the working medium comprises from 10 to 30% by weight of water.

4. The working medium of claim 3, wherein the ionic liquid is a salt of at least one of the cations selected from the group consisting of 1,3-dimethylimidazolium, 1-ethyl-3-methylimidazolium, 1-(n-butyl)-3-methylimidazolium, 1-(n-butyl)-3-ethylimida-zolium, 1-(n-hexyl)-3-methyl-imidazolium, 1-(n-hexyl)-3-ethyl-imidazolium and 1-(n-hexyl)-3-butylimidazolium together with one of the anions chloride or bromide.

5. The working medium of claim 3, wherein the ionic liquid comprises at least one quaternary ammonium salt of the general formula $R^1R^2R^3R^4N^+A^-$, where:

$R^1$ is an alkyl radical having from 1 to 20 carbon atoms;
$R^2$ is an alkyl radical having from 1 to 4 carbon atoms;
$R^3$ is a radical $(CH_2CHRO)_n$—H where n is from 1 to 200 and R=H or $CH_3$; and
$R^4$ is an alkyl radical having from 1 to 4 carbon atoms or a radical $(CH_2CHRO)_n$—H where n is from 1 to 200 and R=H or $CH_3$;
and
$A^-$ is a monovalent anion.

6. The working medium of claim 1, wherein the working medium comprises from 10 to 30% by weight of water.

7. The working medium of claim 1, wherein the ionic liquid consists of salts of organic cations with organic or inorganic anions.

8. The working medium of claim 1, wherein the ionic liquid comprises one or more 1,3-dialkylimidazolium salts.

9. The working medium of claim 8, wherein the ionic liquid is a salt of at least one of the cations selected from the group consisting of 1,3-dimethylimidazolium, 1-ethyl-3-methylimidazolium, 1-(n-butyl)-3-methylimidazolium, 1-(n-butyl)-3-ethylimida-zolium, 1-(n-hexyl)-3-methyl-imidazolium, 1-(n-hexyl)-3-ethyl-imidazolium and 1-(n-hexyl)-3-butylimidazolium together with one of the anions chloride or bromide.

10. The working medium of claim 1, wherein the ionic liquid comprises at least one quaternary ammonium salt of the general formula $R^1R^2R^3R^4N^+A^-$, where:
   $R^1$ is an alkyl radical having from 1 to 20 carbon atoms;
   $R^2$ is an alkyl radical having from 1 to 4 carbon atoms;
   $R^3$ is a radical $(CH_2CHRO)_n$—H where n is from 1 to 200 and R=H or $CH_3$; and
   $R^4$ is an alkyl radical having from 1 to 4 carbon atoms or a radical$(CH_2CHRO)_n$—H where
   n is from 1 to 200 and R=H or $CH_3$;
   and
   $A^-$ is a monovalent anion.

11. An absorption refrigeration machine comprising an absorber, a desorber, a vaporizer, a condenser, a circulation pump and a working medium which is circulated with a circulation pump via absorber and desorber, wherein the working medium fed to the desorber comprises from 5 to 30% by weight of water and from 65 to 95% by weight of a sorption medium consisting of lithium bromide and at least one ionic liquid, where the sorption medium contains ionic liquid and lithium bromide in a weight ratio of from 0.5:1 to 5:1.

12. The absorption refrigeration machine of claim 11, wherein the sorption medium of said working medium contains ionic liquid and lithium bromide in a weight ratio of from 0.5:1 to 2:1.

13. The absorption refrigeration machine of claim 12, wherein said working medium comprises from 10 to 30% by weight of water.

14. The absorption refrigeration machine of claim 13, wherein said ionic liquid is a salt of at least one of the cations selected from the group consisting of 1,3-dimethylimidazolium, 1-ethyl-3-methylimidazolium, 1-(n-butyl)-3-methylimidazolium, 1-(n-butyl)-3-ethylimidazolium, 1-(n-hexyl)-3-methylimidazolium, 1-(n-hexyl)-3-ethyl-imidazolium and 1-(n-hexyl)-3-butylimidazolium together with one of the anions chloride or bromide.

15. The absorption refrigeration machine of claim 13, wherein the ionic liquid of said sorption medium comprises at least one quaternary ammonium salt of the general formula $R^1R^2R^3R^4N^+A^-$, where:
   $R^1$ is an alkyl radical having from 1 to 20 carbon atoms;
   $R^2$ is an alkyl radical having from 1 to 4 carbon atoms;
   $R^3$ is a radical $(CH_2CHRO)_n$—H where n is from 1 to 200 and R=H or $CH_3$; and
   $R^4$ is an alkyl radical having from 1 to 4 carbon atoms or a radical $(CH_2CHRO)_n$—H where n is from 1 to 200 and R=H or $CH_3$;
   and
   $A^-$ is a monovalent anion.

16. The absorption refrigeration machine of claim 11, wherein said working medium comprises from 10 to 30% by weight of water.

17. The absorption refrigeration machine of claim 11, wherein the ionic liquid of said sorption medium consists of salts of organic cations with organic or inorganic anions.

18. The absorption refrigeration machine of claim 11, wherein the ionic liquid of said sorption medium comprises one or more 1,3-dialkylimidazolium salts.

19. The absorption refrigeration machine of claim 18, wherein said ionic liquid is a salt of at least one of the cations selected from the group consisting of 1,3-dimethylimidazolium, 1-ethyl-3-methylimidazolium, 1-(n-butyl)-3-methylimidazolium, 1-(n-butyl)-3-ethylimidazolium, 1-(n-hexyl)-3-methylimidazolium, 1-(n-hexyl)-3-ethyl-imidazolium and 1-(n-hexyl)-3-butylimidazolium together with one of the anions chloride or bromide.

20. The absorption refrigeration machine of claim 11, wherein the ionic liquid of said sorption medium comprises at least one quaternary ammonium salt of the general formula $R^1R^2R^3R^4N^+A^-$, where:
   $R^1$ is an alkyl radical having from 1 to 20 carbon atoms;
   $R^2$ is an alkyl radical having from 1 to 4 carbon atoms;
   $R^3$ is a radical $(CH_2CHRO)_n$—H where n is from 1 to 200 and R=H or $CH_3$; and
   $R^4$ is an alkyl radical having from 1 to 4 carbon atoms or a radical $(CH_2CHRO)_n$—H where n is from 1 to 200 and R=H or $CH_3$;
   and
   $A^-$ is a monovalent anion.

* * * * *